United States Patent [19]

Lantz et al.

[11] 4,237,458

[45] Dec. 2, 1980

[54] STROKE EXPANSION APPARATUS

[75] Inventors: Robert H. Lantz, Round Rock; Alfred A. Schwartz, Leander, both of Tex.

[73] Assignee: International Business Machines Corporation, Armonk, N.Y.

[21] Appl. No.: 52,054

[22] Filed: Jun. 25, 1979

[51] Int. Cl.[3] .............................................. G06F 3/153

[52] U.S. Cl. .................................... 340/739; 340/800; 340/803

[58] Field of Search ............... 340/723, 736, 739, 800, 340/803

[56] References Cited

U.S. PATENT DOCUMENTS

| | | | |
|---|---|---|---|
| 3,402,395 | 9/1968 | Culler et al. | 340/739 X |
| 3,459,926 | 8/1969 | Heilweil et al. | 340/739 X |
| 3,540,032 | 11/1970 | Criscimagna et al. | 340/739 |
| 4,054,951 | 10/1977 | Jackson et al. | 364/900 |

*Primary Examiner*—David L. Trafton

*Attorney, Agent, or Firm*—Douglas H. Lefeve

[57] ABSTRACT

A stroke expansion technique for use in controlling incremental stroke displays. The technique results in a substantial reduction of the stroke memory required for storage of the stroke sequences of an alphanumeric character set. Logic circuitry is operable to recognize a stroke of the same video state (on or off) in the reverse direction of the immediately preceding stroke to cause a predetermined number of additional strokes identical to the immediately preceding stroke to be generated instead of utilizing the reverse stroke to return the beam to its position immediately previous to execution of the preceding stroke.

10 Claims, 4 Drawing Figures

STROKE EXPANSION APPARATUS

DESCRIPTION

BACKGROUND OF THE INVENTION

This invention relates to circuitry for display devices in which alphanumeric symbols or patterns are specified by a series of incremental strokes. More specifically, this invention is primarily directed to a technique for reducing the amount of memory required to specify groups of stroke sequences corresponding to any chosen font of alphanumeric characters.

BACKGROUND ART

(Prior Art Statement)

Representative of the closest known prior art are U.S. Pat. Nos. 4,054,951 to R. D. Jackson, et al, filed June 30, 1976, issued Oct. 18, 1977, entitled "Data Expansion Apparatus", and U.S. Pat. No. 3,540,032 to T. N. Criscimagna, et al, filed Jan. 12, 1968, issued Nov. 10, 1970, entitled "Display System Using Cathode Ray Tube Deflection Yoke Non-Linearity to Obtain Curved Strokes".

U.S. Pat. No. 3,540,032 is a representative example of a prior art incremental stroke display system. A main deflection yoke is used to position the beam to a point on the cathode ray tube (CRT) screen at which is desired to "paint" a character, at which point a character deflection yoke is used to move the beam in incremental strokes with the video circuitry turned on and off, as appropriate, to "paint" the desired character, numeral, symbol, or other pattern. As shown in U.S. Pat. No. 3,540,032 a stroke storage register (10) is utilized to store the data necessary for generating all of the characters, numerals, and other patterns in each of the fonts which the system is capable of displaying.

Typically, before each character is "painted" on the screen a starting position is specified and then a series of incremental position changes is given with additional display on or display off information being given relative to each incremental position change. While many variations are possible, an implementation which has been found to be useful is the specification of each incremental stroke by four bits. This permits three bits to define one of eight directions of motion separated by 45°, and one bit for the display on or display off state of the CRT beam. It is apparent that if each unit stroke is short enough to permit adequate detail when drawing symbols such as e, a, and s, many strokes are needed to draw symbols such as L, E, and F. If the alphanumeric font is extensive, a large memory will be required, and furthermore, memory is often available only in discrete increments.

Because of the availability of memory in discrete incremental sizes only, a relatively low percentage reduction in the number of bits of memory needed to store all of the strokes of the characters, numerals, and patterns of a font can result in a relatively high precentage savings in memory if it is not necessary to utilize an additional increment of memory to complete the storage capability for a chosen set of alphanumeric characters and symbols.

It is, therefore, obvious that some form of data compression would be advantageous in holding to a minimum the size of memory necessary to store the strokes comprising the alphanumeric characters and symbols to be displayed in a given display system. When the stroke sequences comprising characters of an alphanumeric font are studied, it is apparent that in many cases an uninterrupted series of identical strokes is observed. Using the basic method described above of encoding the direction of each incremental stroke with three bits and adding a fourth bit to govern the on or off condition of the video beam, it is apparent that a considerable number of bits is utilized unnecessarily in specifying a series of identical strokes by a series of four bit binary stroke representations.

U.S. Pat. No. 4,054,951 describes a technique applicable to long sections of data that are repeated periodically. In this technique storage space is saved by not including full repetitions of such sections in the data stream, When the data is to be read from storage for utilization the omitted repetitious sections are inserted by providing hardware which recognizes a particular flag occurring in the stored data. Upon recognition of the flag the expansion apparatus interprets the next piece of information in the data stream as being the storage address of the start of a section of data that is to be inserted into the data stream. The next piece of information is interpreted as being the length of the section of data to be inserted and the following piece of information is the number of times that the section of data is to be inserted. From this description it is apparent that this technique supplies the address of data to be inserted which must then be accessed from another section of the storage. For a high speed display system it would be extremely costly, if not impossible, to manage the stroke data in this manner with the requirement that recognition of a flag code in the stream of strokes would require jumping to another section of the stroke memory to retrieve the stroke information. Furthermore, this technique requires the dedication of a particular flag code which in the display stroke technique described above would require the dedication of one of only 16 possible bit patterns assuming four bits for each stroke. Finally, considering the requirement of a flag and three additional data bytes (address, length, and number of repetitions) it is apparent that this prior art technique would not necessarily lead to a significant reduction in the number of bits required for storing the incremental strokes of an alphanumeric character set to be displayed.

Data compression by run length coding can be used to this end. In this case, a few (typically two) bits are added to each stroke to tell the number of strokes to be travelled in the specified direction. Depending on system parameters, some saving in the stroke memory can be realized. Run length coding, however, can result in data expansion when the runs are not long enough and, if implemented, it results in substantial penalties in the instances in which consecutive identical strokes are not present.

It would, therefore, be advantageous to utilize a data compression and expansion technique, which can be applied to unit strokes, does not cause data expansion in the storage of the strokes, and which offers greater net compression than run length coding.

SUMMARY OF THE INVENTION

Accordingly, a technique for compressing incremental stroke data for storage and expanding this data for use by the display is provided which results in a reduction of the stroke memory required. The technique is achieved through the recognition that once a stroke unit or increment is carried out in one of, e.g., eight possible directions, the display system is never operated so that the following stroke will be in the reverse direction and in the same video state (on or off,) as the current stroke. Instead, the strokes are specially mapped and coded in such a manner that the recognition of an immediately succeeding reverse stroke of the same video state as the current stroke serves to flag the display system to take some predetermined automatic action instead of displaying the reverse stroke. As an example, the preferred embodiment described hereinafter is a system in which the recognition of an immediately succeeding reverse stroke of the same video state compared to the current stroke automatically causes two additional strokes identical to the current stroke to be executed. It will be appreciated that with this technique it is not necessary to dedicate a particular code pattern to be used as a flag code which cannot be used as a stroke. It is only necessary that a reverse stroke be recognized of the same video state as an immediately preceding stroke for the circuit to be triggered to automatically provide an additional sequence of strokes.

The foregoing and other objects, features, extensions, and advantages of the invention will be apparent from the following more particular description of preferred embodiments of the invention, as illustrated in the accompanying drawing.

DESCRIPTION OF THE PREFERRED EMBODIMENT

The circuitry described below is for use with a directed beam CRT display system using four bit unit strokes, each stroke including three bits for direction and one bit for beam on/off. The strokes are stored nine to a word so that each word can contain up to 36 bits in groups of four. It will, of course, be understood that the example given relative to number of bits to specify direction and number of strokes which comprise a word are arbitrary and that other systems involving other degrees of resolution for the stroke directions and other lengths of a stroke series to comprise a word are purely a matter of the designer's choice, the present invention being capable of utilization in a wide variety of system designs.

Continuing this example, as many words as are required can be used to paint a character, but a character must start with a new word and one direction of beam-off stroke is reversed for the character end indication. This character end stroke must occur even if an additional word is required for it. The first four bits of a character are not interpreted as a stroke, but contain initial positioning information.

The invention makes use of the fact that a stroke need never be followed by another with the same beam on/off state and with the direction differing by 180°. Since these reverse strokes are unnecessary in the font, they are used in this invention to signify more than one stroke in the direction of the first stroke before a series of one or more reverse strokes. The reverse strokes are not sent to the deflection system. In the preferred embodiment, a reverse stroke is equivalent to two additional strokes of the type which immediately preceded the first reverse stroke, although any number other than two could be chosen for the number of additional strokes to be provided or, alternatively, any other type of automatic operation could be triggered from this recognition of a reverse stroke of the same video state.

Figure 1:
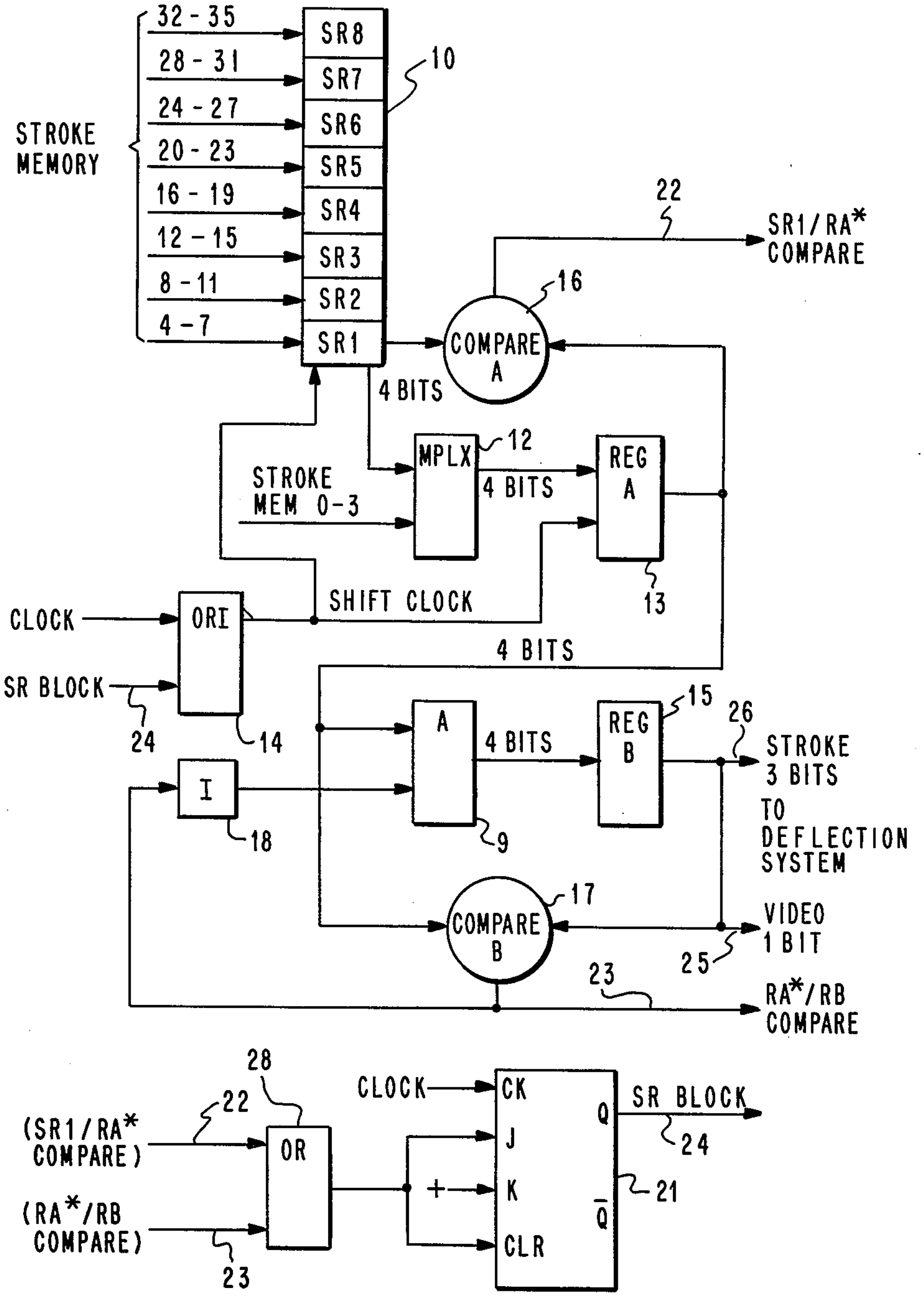
FIG. 1 is a diagram of the preferred embodiment of the stroke decompression logic of this invention.

FIG. 1 shows the logic elements of the preferred embodiment of the invention. In understanding the operation of the circuit of FIG. 1 it is helpful to refer to the data flow shown in FIG. 2 and the timing diagram of FIG. 3. In FIG. 1 as each 36 bit word from the stroke memory is transferred into the decompression circuitry the first four bits of the word are transferred through the multiplexer 12 into a four bit register 13, hereinafter referred to as register A. The remaining 32 bits are loaded into the shift register 10. Both shift register 10 and register A are shifted or loaded by a SHIFT CLOCK pulse generated by the OR-INVERT circuit 14. Shift register 10 and register A are shifted or loaded by negative-going transitions in the SHIFT CLOCK pulse train. The normal case is for the SHIFT CLOCK pulse train to be generated as an inversion of the CLOCK PULSE train applied to the OR-INVERT circuit 14. However, as will be described in detail hereinafter, the presence of a positive SR BLOCK signal from flip-flop 21, which is input to the OR-INVERT circuit on line 24, inhibits any transitions in the SHIFT CLOCK pulse train and the SHIFT CLOCK signal is maintained at a low level during those times that the SR BLOCK signal is positive.

Figure 2:
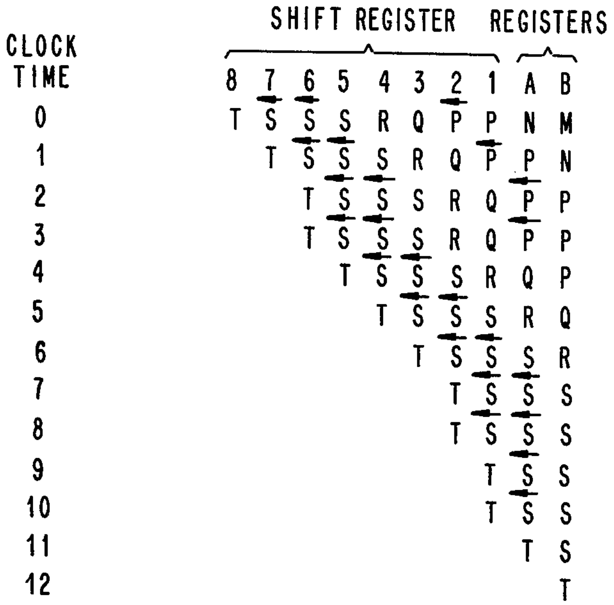
FIG. 2 is a diagram showing data flow of the stroke data through a succession of clock times.

Referring to FIG. 2 at the zero clock time it is shown that a sequence of strokes represented by the characters M, N, P, Q, R, S, and T, are presently stored in registers A and B and in the shift register stages 1–8. It is important to understand that each of the strokes M, N, P, etc., shown in FIG. 2 represent groups of four bits of binary data. Three of the four bits of each group represent one of eight possible directions of the CRT beam while the fourth of the bits in each group represent the on or off state of the CRT beam. Accordingly, for example, register A stores a single incremental stroke, represented in FIG. 2 by N. Register A does not contain the sequence of strokes necessary to generate the character N. Certain of the strokes in FIG. 2 have an arrow above them pointed to the left. This is a pictorial designation of the fact that the stroke is a reverse stroke of the same video state as the identical stroke which preceded the reverse stroke without the arrow above it. The direction of the arrow in FIG. 2 is a pictorial designation only and is not related to the direction in which the CRT beam travels in painting the stroke.

Referring again to FIG. 1, the compare circuit 16, hereinafter referred to as compare A, is connected to have applied to one of its two inputs the four bit stroke resident in the first stage of shift register 10. The other input of compare A is connected to receive the four bit stroke resident in register A. Compare A, therefore, serves as a look ahead device to detect the occurrence of a reverse stroke in the first location of shift register 10, that is a stroke which has the same video state but an opposite direction, or reverse stroke, in comparison with the stroke in register A. When such a condition is detected line 22 is driven to a positive level by compare A.

Codes stored in register A may be shifted into register B through AND gate 9. A comparison circuit 17, hereinafter referred to as compare B, is connected to compare the contents of register A with the contents of register B to generate a positive level signal on line 23 when a reverse stroke is detected in register A as compared with the stroke in register B. When such a positive level signal is present on line 23 the resultant low level signal from the INVERT circuit 18 prevents AND gate 9 from allowing the stroke in register A to be transferred to register B.

Referring to FIGS. 1 and 2 it will, therefore, be noted that registers A and B and the eight stage shift register 10 constitute a pipeline for the stroke data, which pipeline is interposed between the stroke memory and the CRT deflection system. At each clock time the stroke stored by register B is available to the deflection system. Thus, in FIG. 2, at the zero clock time a stroke M is resident in register B, a stroke N is resident in register A, a stroke P is resident in the shift register stage 1, and a P reverse stroke is resident in the shift register stage 2. Since neither of the compare circuits are generating a high level output at the first clock time each of the register contents are shifted to the next register in the pipeline.

Figure 3:
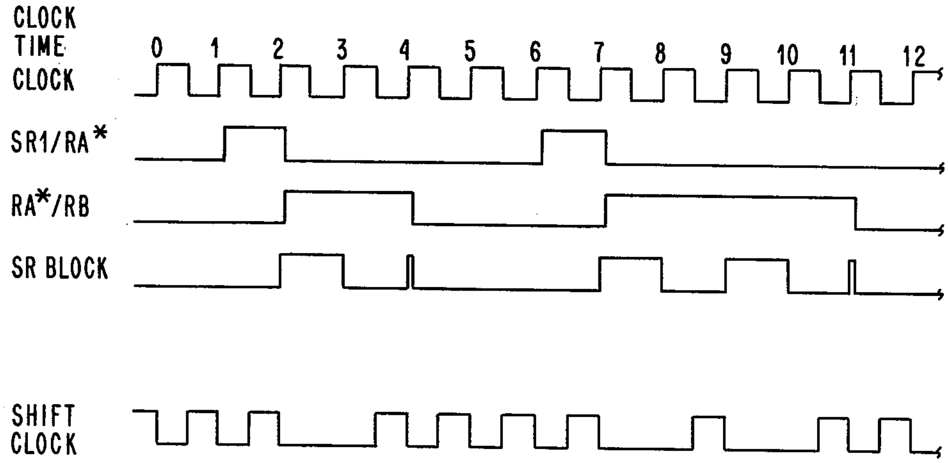
FIG. 3 is a timing diagram showing the states of a number of logic devices of the circuit in FIG. 1 during the flow of the data used in the example for FIG. 2.

Accordingly, at the first clock time an N stroke is resident in register B and available at this time to the CRT deflection system. The P stroke is resident in register A and the P reverse stroke is now stored by shift register stage 1. Referring additionally to FIG. 3 it is noted that after the first clock time the compare A output shifts to a positive level on line 22. This positive level on line 22 is gated through the OR gate 28 and is applied to both the CLR (clear) and J inputs of the J-K flip-flop 21. With these inputs to flip-flop 21 at the second clock time the positive-going edge of the CLOCK pulse train causes flip-flop 21 to toggle and produce a positive level SR BLOCK (shift register block) signal on line 14.

At this second clock time each of the strokes is again shifted in each of the stages of the pipeline. Stroke P is now available to the deflection system and the P reverse stroke is now resident in register A. The output of compare A returns to a low level and the output of compare B shifts to a positive level on line 23 because of the reverse stroke now resident in register A as compared with the stroke now resident in register B.

At the third clock time none of the codes are shifted because of the low state of the SHIFT CLOCK pulse train caused by the positive SR BLOCK signal on line 24 that is applied to an input of the OR-INVERT circuit 14. However, at this time flip-flop 21 toggles back to a reset condition because of the positive level on line 23 from compare B that existed at the beginning of this third clock period. It is now apparent that during the third clock period another P stroke is made available to the deflection circuitry at register B. This is the first of the two automatically generated strokes that are to be generated by virtue of the fact that a reverse stroke of the same video state immediately follows the current (P) stroke. It will, of course, be understood that the automatic operation chosen here is to execute two additional strokes identical to a stroke immediately succeeded by a reverse stroke of the same video state, although it will be obvious to those practicing this invention to implement any other chosen type of automatic operation enabled by the detection of a reverse stroke of the same video state immediately following a current stroke.

Since the output on line 24 of flip-flop 21 was toggled back to a low level at the beginning of the third clock period, the codes are shifted in shift register 10 and register A at the beginning of the fourth clock period. Thus, the stroke codes advance in the shift register 10 and in register A as shown in FIG. 2. However, since compare B was still at a high level at the beginning of the fourth clock period AND gate 9 was not enabled to gate the register A contents into register B. For this reason register B still contains the P stroke during the fourth clock period. This is now the third clock period in which the P stroke is available to the deflection circuitry and this third P stroke constitutes the second of the two automatically generated P strokes. It is also noted that the P reverse stroke has been overwritten by the Q stroke that was shifted from the first stage of shift register 10 into register A.

It will be noted that flip-flop 21 again toggles on for a brief period and then off at the beginning of the fourth clock period by virtue of the positive signal on line 23 that remains until the stroke shifting is completed. Removal of the positive signal on line 23 when compare B returns to a low level causes the CLR input of flip-flop 21 to no longer have a positive input and flip-flop 21 becomes cleared.

At the beginning of the fifth clock period each of the codes is shifted in the stages of shift register 10 and in registers A and B. Flip-flop 21 remains reset and neither of the compare circuits A nor B have positive outputs.

At the sixth clock time compare A now detects a reverse stroke in the first stage of shift register 10 in comparison with the stroke stored in register A. As in the previous example with the P and P reverse strokes, at the beginning of the seventh clock period each of the codes are shifted in shift register 10 and registers A and B. Flip-flop 21 toggles on to provide a positive signal on line 24 to inhibit shifting at the beginning of the eighth clock period. During the seventh clock period compare B senses the reverse stroke in register A compared with the register B stroke and provides the positive signal on line 23 to cause flip-flop 21 to be toggled back to its reset state at the beginning of the eighth clock period. During the seventh clock period the S stroke is available to the deflection system and during the eighth clock period the S is also available to the deflection system. The S stroke available during the eighth clock period is the first of the two S strokes generated automatically in response to the S reverse stroke immediately following the S stroke in the originally stored stroke sequence.

Since flip-flop 21 has now been toggled back to its reset state, at the beginning of the ninth clock time the strokes are shifted in shift register 10 and register A. However, because compare B continued to generate a positive signal during the eighth clock period the S reverse stroke is not shifted from register A to register B. During this ninth clock period the second of the two automatically generated S strokes is available to the deflection system. However, compare B continues to generate a positive output during this time because of the second succeeding reverse stroke that has now been shifted into register A. At the ninth clock time flip-flop 21 is toggled back to an on state because of the positive signal continuing to be generated on line 23 by compare B. Thus, at the tenth clock time the codes are not shifted in shift register 10 and register A. Because of the positive signal from compare B on line 23 the S reverse stroke is not shifted from register A to register B.

During the ninth clock period the second of the two automatically generated S strokes is made available to the deflection circuitry by virtue of the first S reverse stroke that immediately succeeded the S stroke in the originally stored stroke sequence. During the tenth clock period the first of two more automatically generated S strokes is available to the deflection system. This second set of two S strokes are automatically generated by virtue of the second succeeding S reverse stroke that was present in the originally stored sequence of strokes.

During the tenth clock period an S stroke is available to the deflection system. At the beginning of the tenth clock period flip-flop 21 again becomes reset. Thus, at the eleventh clock time the shift register 10 and register A contents are shifted so that register A now contains a new stroke. The S reverse stroke previously resident in register A is not shifted into register B because of the positive signal on line 23 from compare B that existed at the beginning of this clock period. During the eleventh clock period the second stroke of the second set of automatically generated S strokes is available to the deflection system. At the beginning of the eleventh clock period flip-flop 21 toggles on briefly and then back off in the same manner as at the beginning of the fourth clock period. At the twelth clock time another shift of all of the registers occurs and the last stroke of the stored sequence of strokes is available to the deflection system.

Referring again to FIGS. 1 and 2 it will be remembered that nine strokes at a time are loaded into the shift register 10 and register A circuitry in FIG. 1. In FIG. 2 it will be noted that for these nine strokes that were loaded, in this example 12 strokes were made available by the circuitry to the deflection system. In this example, therefore, it is apparent that a 25% savings in memory has resulted by compressing and decompressing the stored data in this manner.

From the preceding it is apparent that compare A initiates automatic operation in response to the detection of a reverse stroke sequence, while compare B maintains this automatic operation. This may result in a restriction in the preferred implementation shown. That is, since the last stroke of a nine stroke word goes into register B when a new word is loaded, it is not possible to detect reverse strokes across word boundaries, and the sequence of strokes stored in the stroke memory for each symbol must conform to this restriction. This restriction can be readily overcome, however, by use of a third compare circuit connected to sense a reverse stroke in the first stroke of the next word in the stroke memory to be transferred to the decompression logic in comparison with the stroke resident in register A.

Figure 4:
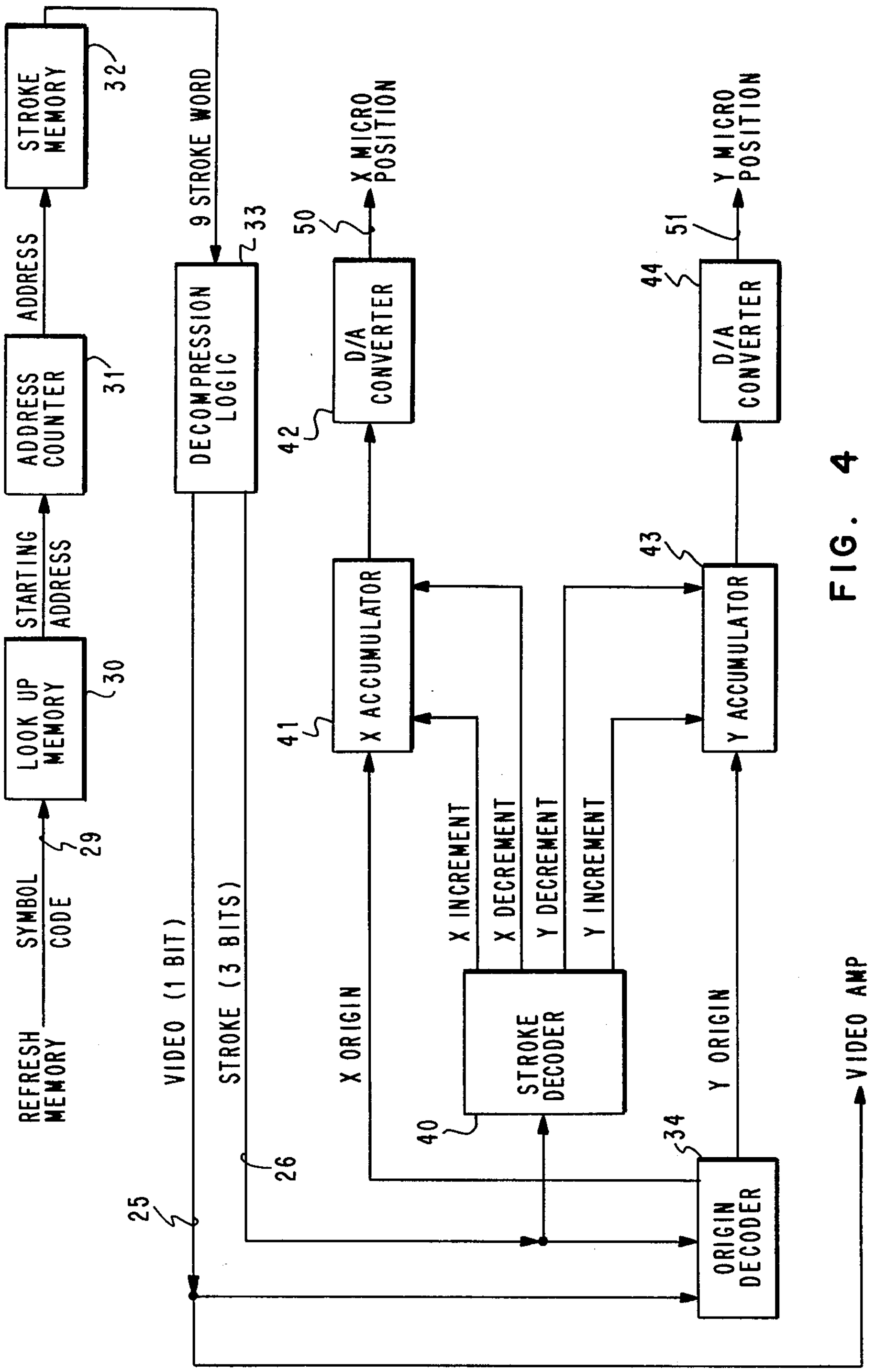
FIG. 4 is a block diagram of the character deflection portion of a typical incremental stroke display system with which the present invention is advantageously utilized.

Referring to FIG. 4 a block diagram of the character deflection portion of a typical incremental stroke display system is shown with which the present invention is advantageously utilized. During each CRT display refresh cycle each of the alphanumeric symbol codes to be displayed in the frame are transferred from a refresh memory along line 29 to a look up memory 30. Memory 30 may be implemented, for example, in read-only memory in table form to supply a starting address to an address counter 31 which addresses the stroke memory 32 to supply as many nine stroke words as are necessary to "paint" an alphanumeric symbol corresponding to each code accessed in the refresh memory. The nine stroke words from the stroke memory 32 are applied to the decompression logic 33 which is the essence of this invention as described in FIGS. 1–3. The output of the decompression logic comprises a video on/off signal on line 25 and a stroke direction comprising three bits on line 26. The stroke direction and video signals are applied to both the origin decoder 34 and the stroke decoder 40.

The origin decoder 34 decodes the first stroke of each alphanumeric symbol to command the x and y accumulators 41 and 43 to correctly position the CRT beam to the starting position for "painting" the particular alphanumeric symbol. All strokes succeeding the origin stroke are applied to the stroke decoder 40 to cause the accumulators 41 and 43 to be incremented and decremented as necessary in accordance with the stroke data, to move the CRT beam around correctly to "paint" the alphanumeric symbol. With each stroke the video on/-off signal turns the CRT beam on and off as appropriate. The quantities of x and y increments or decrements accumulated by accumulators 41 and 43 are applied through the digital-to-analog converters 42 and 44 which, in turn, provide output signals on lines 50 and 51 which are applied to the microposition deflection coils to appropriately position the CRT beam.

FIG. 4 is shown, of course, for the purposes of background and reference only, it being understood that the structure of the present invention resides in the decompression logic which is shown and described in detail by FIGS. 1–3.

Thus, a technique has been shown for reducing the amount of memory required to specify groups of stroke sequences corresponding to any chosen font of alphanumeric characters. Logic circuitry is operable to recognize a stroke of the same video state (on or off) in the reverse direction of the immediately preceding stroke to cause a predetermined number of additional strokes identical to the immediately preceding stroke to be generated instead of utilizing the reverse stroke to return the beam to its position immediately previous to execution of the preceding stroke. With this technique it is not necessary to dedicate a particular code pattern to be used as a flag code for causing this automatic operation, which flag code could not also be used as stroke. It will also be recognized that the concept of causing two additional strokes to occur in response to the detection of a reverse stroke is simply an example used in describing the invention and is not intended to be limiting as any other automatic operation might be chosen to be triggered by this occurrence.

While the invention has been shown and described with reference to particular embodiments thereof, it will be understood by those skilled in the art that the foregoing and other changes in form and details may be made therein without departing from the spirit and scope of the invention.

What is claimed is:

1. In a display system in which a sequence of strokes define individual symbols, the improvement comprising:

detecting means for generating a first signal upon the detection of a first stroke immediately succeeded by a second stroke of opposite direction to said first stroke and of the same video state as said first stroke; and means responsive to said first signal for automatically initiating another display system operation.

2. In the display system of claim 1 wherein said detecting means further comprises look ahead means for generating said first signal before said second stroke has been executed by said display system.

3. In the display system of claim 2 further comprising means responsive to said first signal for inhibiting the execution of said second stroke.

4. In the display system of claim 3 wherein said means for automatically initiating another display operation further comprises means for generating a predetermined plurality of strokes identical to said first stroke and immediately following said first stroke.

5. In the display system of claim 4 wherein said predetermined plurality is two.

6. In a display system in which a sequence of strokes define individual symbols, the improvement comprising:

first storage means for storing a plurality of strokes;

second storage means for storing at least a single stroke;

means for loading a first stroke of said sequence of strokes into said second storage means and the remaining strokes of said sequence of strokes into said first storage means;

means for comparing the direction and video state of said first stroke stored in said second storage means with a second stroke stored in said first storage means;

means for generating a first signal upon the detection by said comparison means that said first stroke and second stroke are of opposite direction and the same video state;

means responsive to said signal for (a) automatically initiating another display operation and (b) inhibiting the execution of said second stroke.

7. In the display system of claim 6 further comprising a third storage means; transfer means for transferring said first stroke from said second storage means to said third storage means and said second stroke from said first storage means to said second storage means and wherein said means responsive to said signal for (b) inhibiting the execution of said second stroke includes means for inhibiting the transfer of said second stroke to said third storage means.

8. In the display system of claim 7 wherein said means responsive to said signal for (b) inhibiting the execution of said second stroke includes second comparison means for comparing the direction and video state of said first stroke stored in said third storage means and said second stroke stored in said second storage means.

9. In the display system of claim 8 wherein said first storage means comprises a multiple stage shift register.

10. In the display system of claim 9 wherein said second storage means comprises a single stage shift register.

* * * * *